US009010815B2

(12) United States Patent
Cooper

(10) Patent No.: US 9,010,815 B2

(45) Date of Patent: Apr. 21, 2015

(54) ANTI-THEFT SYSTEM

(75) Inventor: Vince Cooper, Durham (GB)

(73) Assignee: Black & Decker Inc., Newark, DE (US)

( * ) Notice: Subject to any disclaimer, the term of this patent is extended or adjusted under 35 U.S.C. 154(b) by 923 days.

(21) Appl. No.: 12/958,927

(22) Filed: Dec. 2, 2010

(65) Prior Publication Data

US 2011/0133496 A1 Jun. 9, 2011

(30) Foreign Application Priority Data

Dec. 7, 2009 (EP) .................................... 09178214

(51) Int. Cl.

| | |
|---|---|
| ***E05C 5/04*** | (2006.01) |
| ***B25F 5/02*** | (2006.01) |
| *H01M 2/10* | (2006.01) |

(52) U.S. Cl.

CPC ........................................ *B25F 5/02* (2013.01)

(58) Field of Classification Search

USPC ........... 292/1, 251, 256, 256.67, 341.15, 254, 292/145, 148, 149, 150, 151, 155, 175, 176, 292/291, 301, 307 R, 307 B; 429/96, 97, 429/100, 121

See application file for complete search history.

(56) References Cited

U.S. PATENT DOCUMENTS

| | | | | |
|---|---|---|---|---|
| 311,910 | A * | 2/1885 | Moeller | 292/175 |
| 949,409 | A * | 2/1910 | Badger | 292/32 |
| 3,999,110 | A | 12/1976 | Ramstrom et al. | |
| 4,160,857 | A * | 7/1979 | Nardella et al. | 429/97 |
| 4,276,358 | A * | 6/1981 | Henson et al. | 429/97 |
| 4,871,629 | A * | 10/1989 | Bunyea | 429/97 |
| 5,213,913 | A * | 5/1993 | Anthony et al. | 429/97 |
| 5,553,675 | A * | 9/1996 | Pitzen et al. | 173/217 |
| 6,168,881 | B1 * | 1/2001 | Fischer et al. | 429/97 |
| 6,308,378 | B1 | 10/2001 | Mooty et al. | |
| 6,729,415 | B1 * | 5/2004 | Huang | 173/217 |
| 6,909,260 | B2 * | 6/2005 | Parker | 320/107 |
| 7,007,986 | B2 * | 3/2006 | Lodwick, Jr. | 292/251 |
| RE40,681 | E * | 3/2009 | Pitzen et al. | 429/97 |
| 7,501,198 | B2 * | 3/2009 | Barlev et al. | 429/97 |
| 7,540,334 | B2 * | 6/2009 | Gass et al. | 173/2 |
| RE40,848 | E * | 7/2009 | Pitzen et al. | 429/100 |

(Continued)

FOREIGN PATENT DOCUMENTS

| | | |
|---|---|---|
| CA | 2283552 | 3/2001 |
| EP | 1455319 | 9/2004 |

(Continued)

OTHER PUBLICATIONS

Computer Generated Translation for JP 09158483 A.*

*Primary Examiner* — Kristina Fulton

*Assistant Examiner* — Alyson M Merlino

(74) *Attorney, Agent, or Firm* — Stephen R. Valancius

(57) ABSTRACT

An anti-theft system for securing a removable battery to a power tool. The system employs a tamper-proof retainer to ensure that the retail display of a combined power tool and its associated battery can be displayed as a single unit without fear of theft of the battery. This may be achieved by the tamper-proof retainer securing a battery release latch against its release position hence securing the battery to the tool in a manner preventing the removal of the battery by a potential thief. The tamper-proof retainer either prevents removal of the battery from the power tool, as removal of the tamper-proof retainer is impossible, or, if it is destroyed by a thief, then it permanently secures the battery to the power tool.

11 Claims, 4 Drawing Sheets

(56) References Cited

U.S. PATENT DOCUMENTS

| | | | | |
|---|---|---|---|---|
| 7,648,383 | B2 * | 1/2010 | Matthias et al. | 439/352 |
| 7,828,185 | B2 * | 11/2010 | Hofmann et al. | 227/156 |
| 8,048,552 | B1 * | 11/2011 | Mao | 429/97 |
| 8,228,029 | B2 * | 7/2012 | Meyer et al. | 320/114 |
| 8,733,471 | B2 * | 5/2014 | Nagasaka et al. | 173/217 |
| 2005/0058890 | A1 * | 3/2005 | Brazell et al. | 429/99 |
| 2006/0222930 | A1 | 10/2006 | Aradachi | |
| 2006/0222931 | A1 * | 10/2006 | Lin | 429/100 |
| 2009/0145945 | A1 | 6/2009 | Heinzen | |
| 2009/0246608 | A1 * | 10/2009 | Wu et al. | 429/100 |
| 2012/0045678 | A1 * | 2/2012 | Hayashi et al. | 429/100 |
| 2013/0091905 | A1 * | 4/2013 | Brown | 70/15 |

FOREIGN PATENT DOCUMENTS

| | | |
|---|---|---|
| EP | 1690648 | 8/2006 |
| JP | 09158483 A * | 6/1997 |

* cited by examiner

ANTI-THEFT SYSTEM

BACKGROUND OF THE INVENTION

The present invention relates to an anti-theft system for securing a removable battery to a power tool intended for retail display and has particular, although not exclusive, relevance to retail displays which are provided at power tool outlets and which customers will often touch in order to feel the tool before making a purchase. Modern power tools tend to be cordless and, therefore, include a removable battery pack. The battery pack is removable so that it can be recharged independently of the tool which it powers, once flat.

Because the power tool and removable battery are displayed together at the retail outlet, the propensity for theft exists. It is, unfortunately, not uncommon for the battery packs to be removed from the tool and stolen. This is because battery packs tend to "run down" with the use—their efficiency diminishes with time. Because of their chemical composition they are expensive articles and, therefore, highly attractive for thieves.

Although securing the tool to a retail display, for example, is possible, this is a more difficult task with a battery pack. One of the main reasons for this difficulty lies with the inability to screw a retaining item into the battery pack as to do so would potentially destroy the chemical composition of the battery cells required in order to retain and deliver electrical charge to the motor of the tool.

Although the art is replete with anti-theft systems for power tools, they tend to be directed at different aspects to the issue of prevention of theft of a removable battery at retail.

For example EP1,690,648 A has a system in which the user of the tool wears a certification unit as a belt in order that a correlating code be transmitted between the tool and the user's belt in order to confirm authentication and, therefore, possible absence or theft of the tool.

A similar theme is followed in respect of CA 2,283,552 A, in which an activation code and ownership identification system is mounted to a power tool in order to display correct ownership information.

An alternative system is shown in EP 1,455,319 A, in which a tool is provided with control electronics as a transceiver unit cooperating with a remote handheld control unit in order to enable or disable the tool remotely.

None of this art, however, addresses the issue of a removable battery pack possibly being stolen at retail. The concept of a removable battery packs is well-known in the art. For example U.S. Pat. No. 6,308,378 and a U.S. Pat. No. 3,999,110 show typical examples.

The above examples of removable battery packs suffer the disadvantage that, if the tool with its attached battery pack were displayed at retail, the battery pack could be removed from the tool and stolen. In such a case, none of the antitheft systems shown above would be able to cope with recognising that the battery had been stolen.

US 2009 145945 discloses a tool and a battery for use therewith. The battery has a latching system co-operable with the tool in order to releasably retain the battery to the tool.

SUMMARY OF THE INVENTION

Provision of a tamper-proof retainer ensures that the composite tool/battery pack can be displayed at retail as a single unit—i.e. as the tool would be in use with the battery pack attached. Also this permits secure retention of the battery pack, as its removal is either impossible, or, if possible, results in the destruction of the coupling between the battery pack and the tool. The latter is a clear disincentive to any attempt to steal the battery pack. A retaining latch may be formed on either the battery or the tool, the latch moveable between a first position securing the battery to the tool and a second position for releasing the battery from the power tool and wherein the tamper-proof retainer prevents actuation of the latch to the second position for securing the battery with the power tool.

Although the tamper-proof retainer can act directly on the latch, it may include a cover, which cover is secured to either the battery or the tool to overlie or abut the latch and engage therewith to restrain the latch in the first position, thereby preventing actuation of the latch and, hence, removal of the battery from the tool.

DETAILED DESCRIPTION OF THE DRAWINGS

An embodiment of the present invention will now be described, by way of example only and with reference to the accompanying drawings of which:

DETAILED DESCRIPTION OF EXEMPLARY EMBODIMENTS OF THE INVENTION

Figure 1:
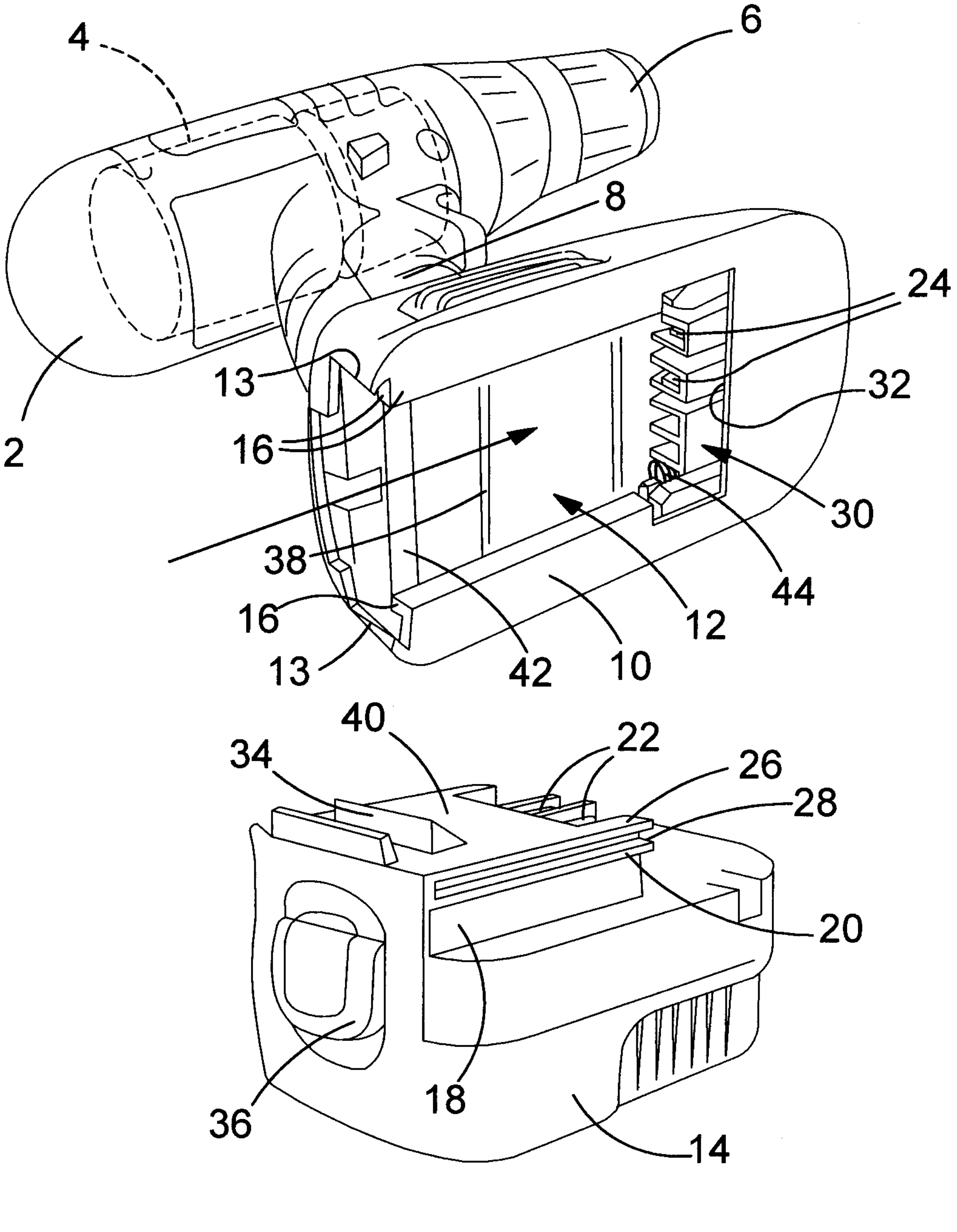
FIG. 1 illustrates schematically a power tool and a battery therefor.

Referring firstly to FIG. 1 it can be seen that a drill 2 comprises a main body 4 at the forward end of which is a chuck mechanism 6 for retention of a drill or screwdriver bit, or the like (not shown for clarity). Depending from the body 4 is a handle 8, the other end of which terminates in a battery mounting shoe 10.

The shoe 10 is formed from plastics material and includes a recess 12 into which a battery 14 may be inserted for retention therein. The recess 12 is formed from a pair of depending flanks 13 of the shoe 10, terminating in upturned stub members 16 thereby forming a generally U-shaped catchment area for insertion of the battery 14.

The battery 14 has formed thereon two longitudinal extending side recesses 18 (only one of which can be seen in FIG. 1), each with an overhang 20 there above. The battery 14 is inserted into the shoe 10 in the direction of the arrow shown in FIG. 1. On insertion, each overhang 20 contacts a respective stub 16 and the recess 18 travels along the stub 16.

The battery 14 carries electrical connections 22 arranged to couple with corresponding connectors 24 formed on the shoe 10. Each connection 22, 24 is shaped to ensure that, as the battery 14 is inserted into the shoe 10 and reaches the limit of its travel in the direction of the arrow of FIG. 1, adequate physical and electrical coupling is made between each of the connectors 22 and 24.

As is known in the art, the connectors 22 and 24 can be formed in a particular profiled shape of physical coupling 26, 28 and 30,32 respectively, to ensure that only an appropriately shaped coupling 26,28 is able to mate with a correspondingly acceptable coupling 30, 32. This ensures only correct batteries can be accepted within the shoe 10. This can be very useful if, for example, the power tool, here drill 2, is made to accept a range of batteries each with a different power output. Also, if a manufacturer makes a range of power tools, each with a different battery power output, this facility allows selective coupling only with an appropriate battery. All non-appropriate batteries will not mate with the shoe 10 correctly so no electrical connection or proper physical coupling can be made.

The battery 14 also carries a retaining latch, here latch 34, manually actuable by catch 36. The latch 34 is permanently biased (by a spring or the like, not shown) into its extended position shown in FIGS. 1, 2 and 4. In this position, the latch 34 protrudes above the upper surface 40 of the battery 14. The latch 34 is also shaped to be chamfered to present a sloping surface as it is inserted into the shoe 10. Thus, as the battery enters the shoe 10 and the latch 34 contacts the upper surface 42 of the opening 12, it is deflected down into the battery 14 thereby allowing further insertion of the battery into the opening 12 of the shoe 10.

Formed on the upper surface 42 of the shoe 10 opening 12 is a recess 38. The recess extends across the width of the opening 12 and is placed to accept the top of the latch 34 as it aligns therewith. This happens as a result of the biasing of the latch into its extended position, as will be appreciated. Accordingly, a detent mechanism is provided for retention of the battery 14 within the shoe 10 when fully inserted thereinto.

FIG. 1 illustrates the way in which the battery 14 is inserted into the shoe and retained removably therewithin. The retention of the battery is normally (that is without the anti-theft system of the present invention) entirely reversible and is achieved simply by the user moving the catch 36 so as to urge the latch 34 downwards to disengage with the recess 38. Once this happens, a spring 44, formed in the shoe 10 at the end of the opening 12 (which is under compression while the battery 14 is retained in the shoe opening 12) acts to urge the battery 14 out of the opening 12. Although the spring tension may be insufficient to completely eject the battery 14 from the opening 12 (and, indeed this may be undesirable as being dangerous), it will at least allow the user to remove the battery 14.

Figure 2:
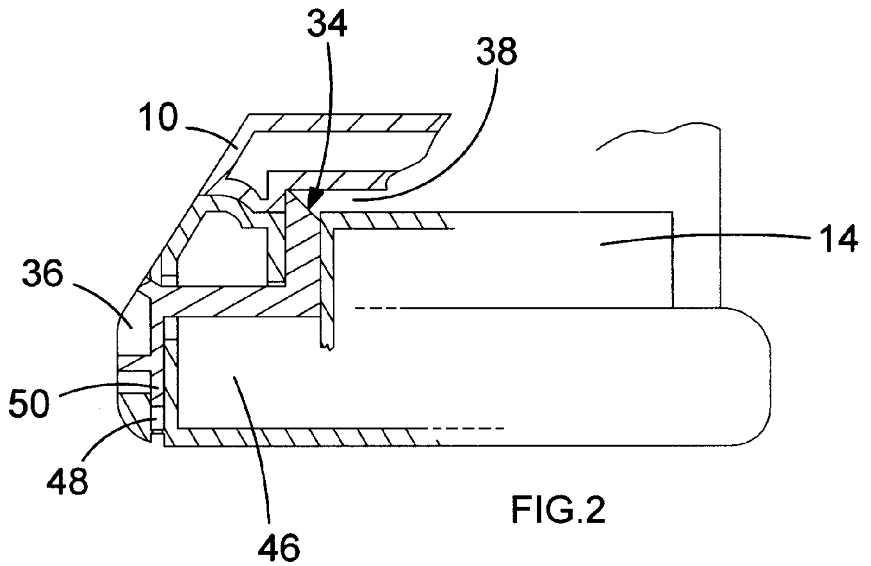
FIG. 2 illustrates a side sectional view of a battery in accordance with FIG. 1 when secured to the power tool.
Figure 3:
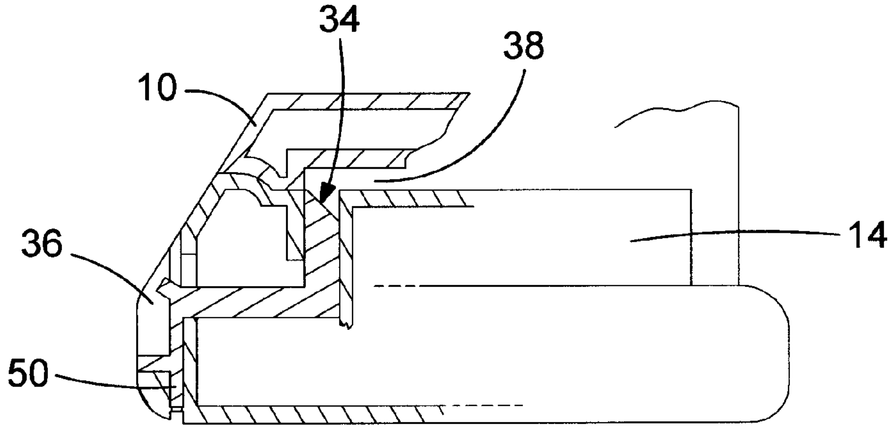
FIG. 3 illustrates a side sectional view of a battery of FIG. 2, but in its unlatched position.
Figure 4:
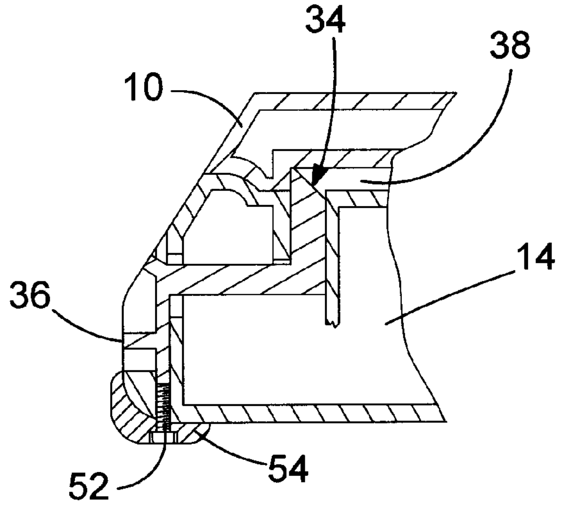
FIG. 4 shows the battery of FIGS. 2 and 3 with the tamper-proof retainer securing the battery in position on the power tool.

Referring now also to FIGS. 2-4, the method of battery retention within the shoe can be more clearly seen. The latch 34 is coupled directly to the catch 36. In this example they are formed form a unitary plastics member, although they may be separate components physically linked together to act in unison. It is required that actuation by a user of the catch 36 causes movement of the latch 34 downwards into the battery recess 46.

Below the catch 36 the battery has a channel 48 formed therein. A depending arm 50 of the catch 36 is able to travel in the recess 48 as the catch 36 is moved. It can be seen that in FIG. 2 the catch 36 is in its uppermost position, resulting in the latch 34 projecting beyond the battery 14 upper surface. This is the normal, or rest, position of the latch 34, as it is spring (not shown) biased. The spring biasing can, of course, be overcome with application of sufficient force to the catch 36 in the opposite direction (downwards in the example of FIG. 1).

As the latch 34 projects beyond the upper surface of battery 14, when (as is the case of FIG. 1) the battery is sufficiently inserted into the shoe 10 opening 12, then, in the absence of a sufficient force urging the catch 36 downwards, the latch 34 will move up into the recess 38 and hence retain the battery 14 in the opening 12. This is the situation shown in FIG. 2.

If the user exerts sufficient downward force against the catch 36 to overcome the biasing force urging the latch upwards, then the situation of FIG. 3 results. Here it can be seen that the battery 14 can be removed form the opening 12, as the latch 34 is no longer protruding into the recess 38 and, hence, is free to be removed from the opening 12.

However, in the case where it is desired to exhibit the tool 2/battery 14 combination (i.e. with the battery 14 captive within the recess 12 of the tool 2) at retail environment, permanent retention of the battery 14 is desirable. This can be achieved, for example, by the way shown in FIG. 4. In this FIG. 4 a tamper-proof retainer, in this example screw 52 is inserted into the recess 48 after insertion of the battery 14 into the opening 12 in order to prevent travel of the arm 50 therewithin. Any attempt by the user of the catch 36 to move it to its release position (that of FIG. 3) fails, as the arm 50 cannot travel due to the obstacle of the screw 52.

As will be known to those skilled in the art, the tamper-proof screw has a head incorporating a chamfered recess which permits a suitably shaped screwdriver to mate therewith, but only to be able to rotate the head (and, hence the screw 52) in one sense. Any attempt to rotate the head in the opposite sense results in the screwdriver camming out of the head due to the chamfering. This allows insertion of the screw 52 into the recess 48, but prevents its removal.

Alternatively, the screw 52 may be of a design which permits its removal, but this will then render the coupling between the battery 14 and the drill 2 useless, as will be explained further below.

Figure 5:
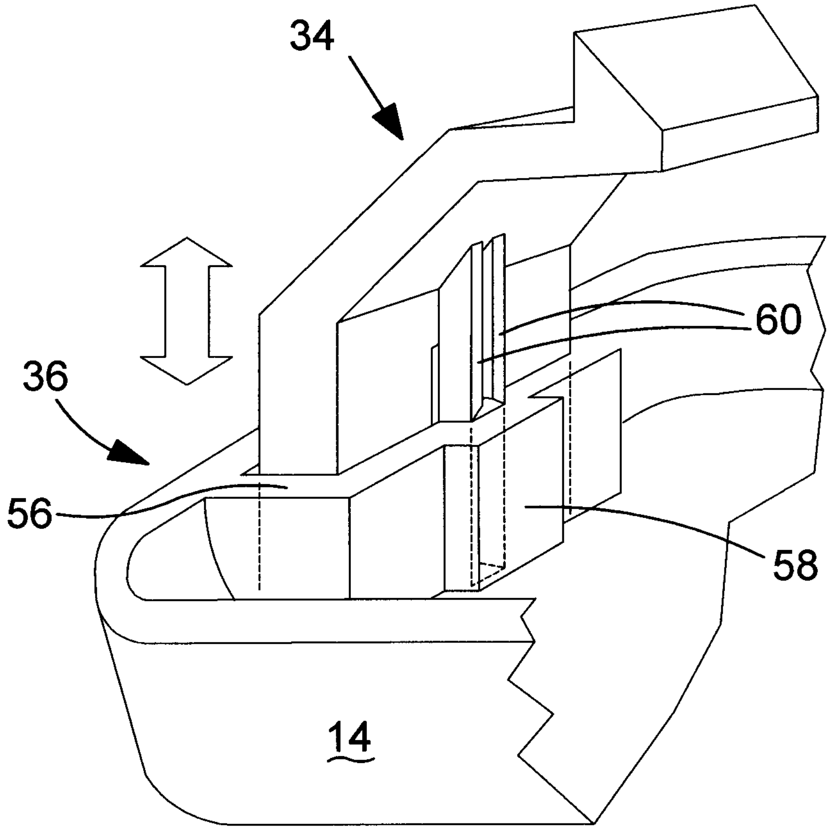
FIG. 5 illustrates schematically an alternative embodiment of the present invention.

In the example of FIGS. 4 and 5 an attachment serves as a visual warning 54 and is retained to the battery 14 by the screw 52. This warning serves to inform prospective thieves that the battery is permanently secured to the drill 2 in the hope that the thief will then not attempt to remove the battery. This is desirable as any attempt to remove the screw 52 may result in damage to the battery 14, the drill 2, or both. Hence a visual warning that there is an active security system in operation may, on its own, serve as a good deterrent to potential damage to the tool/battery combination.

Figure 6:
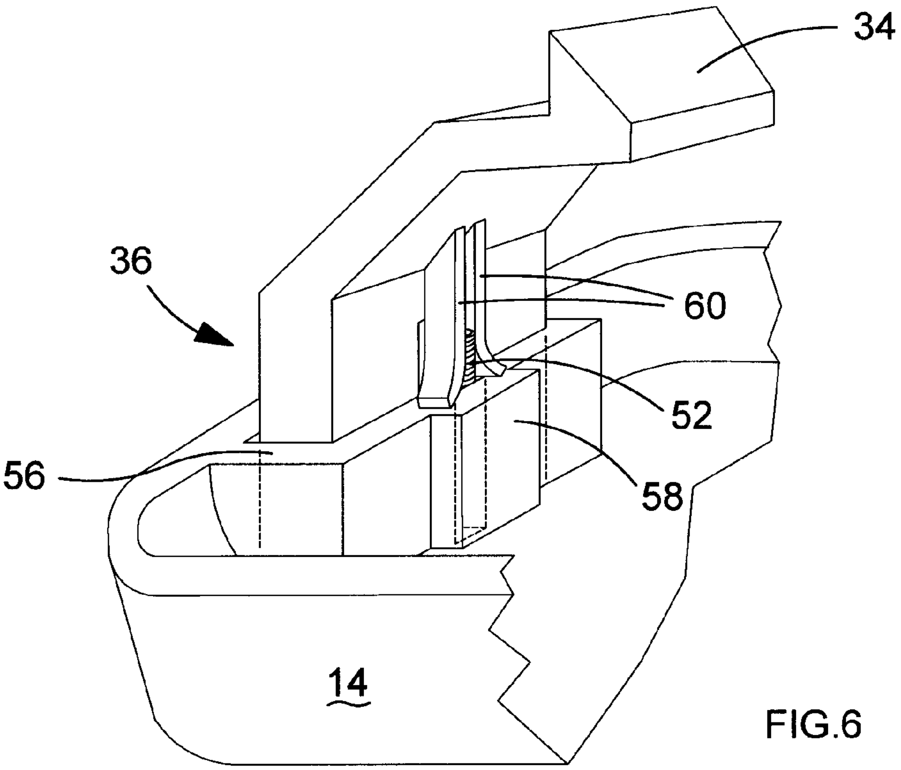
FIG. 6 illustrates the embodiment of FIG. 5 with the tamper-proof retainer inserted into a portion of the battery pack.
Figure 7:
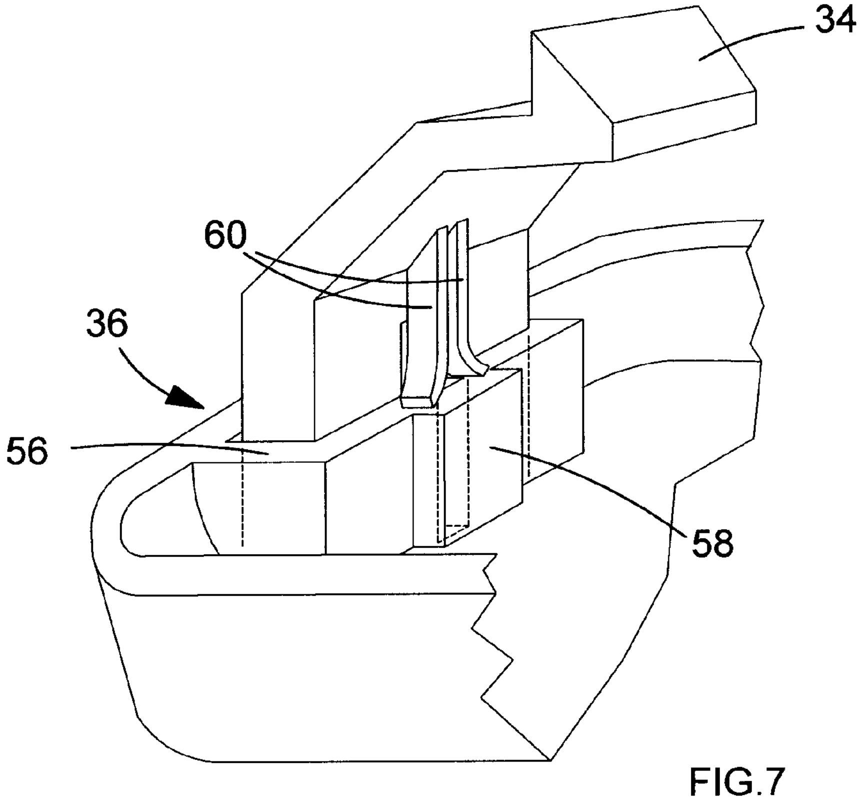
FIG. 7 illustrates the embodiment of FIG. 6 with the tamper-proof retainer having been vandalised.

Turning now to FIGS. 5, 6 and 7 an alternative embodiment of the present invention is illustrated. In these figures, like components to those of the previous figures are similarly numbered.

The battery 14 has formed therein a wall portion 56 through which the latch 34 may travel. As in the earlier embodiment, the latch 34 is spring biased (spring not shown) to be urged into its extended position, which is the position shown in FIG. 5.

The wall portion 56 defines a pocket 58, the use of which is described below.

In this embodiment, the latch 34 has a pair of security ribs 60 formed thereon. These ribs, being part of the latch 34 also travel with movement of the latch into the pocket 58. Thus, when the user moves the catch 36 (not visible in FIGS. 5-7) downward, the latch 34 moves down to allow the battery 14 to be either inserted into or removed from the recess 12, as has been described above. Concomitantly, the ribs 60 move down into the pocket 58.

As shown in FIG. 6, the underside of the pocket 58 permits access by a user in order to be able to insert a retaining member, here a tamper-proof screw 52, as was the case with the previous embodiment. The screw 52 can be seen in FIG. 6 to have been inserted into the space between the two security ribs 60 via the pocket 58. Insertion of the screw 52 takes place when the battery 14 is positioned within the recess 12.

Importantly the screw 52 has caused the ribs 60 to be splayed apart from one another.

This splaying action of the ribs 60 means that they now overlie not the pocket 58, but the wall 56 of the battery 14, thus preventing any downward movement of the catch 36 and latch 34.

Importantly, the splaying of the ribs 60 means that downward movement of the catch 36 and latch 34 are impossible, whether the screw 52 remains inserted between the ribs 60 or not. For example, even though the screw 52 is tamper-proof, it is always possible for a determined thief to remove it by partial destruction of the battery 14 (rather then an attempt to simply unscrew it—which would prove fruitless, given the anti-tamper nature of the screw 52), or drilling through it or the like.

FIG. 7 illustrates the situation of vandalism of the screw 52 resulting in its removal. As can be seen from the figure, the splayed ribs 60 are unaffected by the removal of the screw 52 and remain positioned over the wall 56, thus preventing any movement of the catch 36 and latch 34 and, hence, preventing removal of the battery from the tool 2.

Those skilled in the art will appreciate that it is possible to include an audible alarm with the above security system. In the event of any attempted or actual removal of the battery from the tool, an alarm will sound hence alerting a member of the retail staff to the crime.

It will be apparent that the retention latch, in these examples latch 34 could be formed on either the tool 2 or the battery 14 without deviating from the scope of the present invention.

The present invention permits a flexible security system, in that no or very little modification of existing tool/battery combinations are necessary in order to implement the system. Use is made of existing battery/tool features (such as the catch 36, the recess 48, the arm 50) in order to keep costs to a minimum. All that is required is the addition of a tamper-proof retainer, such as screw 52 and/or cover 54.

Those skilled in the art will appreciate that whilst a screw 52 has been illustrated as a tamper-proof retainer, other forms of tamper-proof retainer work with equal utility in the present invention. For example, blind rivets. The important feature is that, once inserted, a tamper-proof retainer is not able to be readily removed at the retail display. No retainer is able to be permanently affixed, as a determined thief will always be able to smash or otherwise destroy the retainer. However, destruction is not to be equated with the ability to resist tampering (i.e. resist normal removal).

Although exemplary embodiments of the present invention have been shown and described, it will be appreciated by those skilled in the art that changes may be made to these embodiments without departing from the principles and spirit of the invention, the scope of which is defined in the appended claims and their equivalents

The invention claimed is:

1. An anti-theft system for securing a removable battery to a power tool, the system comprising:
- a power tool;
- a battery, and
- a tamper-proof retainer;
- wherein the anti-theft system further includes a retaining latch formed on either the battery or the tool, the latch moveable by a latch actuator between a first position securing the battery to the tool and a second position for releasing the battery from the power tool and wherein the tamper-proof retainer prevents actuation of the latch to the second position in order to secure the battery to the power tool;
- wherein the latch actuator moves along a first path to effect movement of the latch between the first position and the second position; and
- wherein the tamper-proof retainer is disposed along the first path to block movement of the latch actuator along the first path and thereby prevent movement of the latch to the second position.

2. An anti-theft system according to claim 1 wherein the tamper-proof retainer includes a cover, which cover is secured to either the battery or the tool to overlie or abut the latch actuator; and
- wherein the cover includes a visual warning to deter thieves.

3. An anti-theft system according to claim 1 wherein the tamper-proof retainer is a tamper-proof screw.

4. An anti-theft system according to claim 1 wherein the latch actuator is formed integrally with the latch.

5. An anti-theft system according to claim 1 wherein the latch is biased into its first position.

6. An anti-theft system comprising:
- a power tool;
- a battery configured to be removably coupled to the power tool,
- a tamper-proof retainer for selectably securing the battery to the power tool, and
- a retaining latch formed on either the battery or the tool, the latch moveable by a latch actuator between a first position securing the battery to the tool and a second position for releasing the battery from the power tool and wherein the tamper-proof retainer prevents actuation of the latch to the second position in order to secure the battery to the power tool;
- wherein at least one of the power tool and the battery further comprises a recess for receiving the tamper-proof retainer; and
- wherein the tamper proof retainer prevents movement of the latch from the first position to the second position by blocking movement of the latch actuator into the recess.

7. The anti-theft system according to claim 6, wherein the tamper-proof retainer includes a cover, which cover is secured to either the battery or the tool to overlie or abut the latch actuator; and
- wherein the cover includes a visual warning to deter thieves.

8. The anti-theft system according to claim 6, wherein the tamper-proof retainer is a tamper-proof screw.

9. The anti-theft system according to claim 6, wherein the latch actuator is formed integrally with the latch.

10. The anti-theft system according to claim 6, wherein the latch is biased into its first position.

11. A power tool system comprising:
- a power tool;
- a battery pack for providing power to the power tool;
- wherein at least one of the battery and the power tool includes a latch;
- wherein the latch is movable between a first position and a second position by a latch actuator;
- wherein when the battery pack is engaged with the power tool and the latch is in the first position, the latch prevents removal of the battery pack from the power tool; and
- wherein when the battery pack is engaged with the power tool and the latch is in the second position, the battery pack can be removed from the power tool;
- the system further comprising a security device which prevents movement of the latch from the first position from to the second position;

wherein the security device is a tamper proof retainer;

wherein the power tool system further comprises a recess for receiving the tamper proof retainer; and wherein the tamper proof retainer prevents movement of the latch from the first position to the second position by blocking movement of the latch actuator into the recess.

* * * * *